United States Patent [19]

Tanabe

[11] Patent Number: 5,358,579
[45] Date of Patent: Oct. 25, 1994

[54] METHOD FOR MANUFACTURING A PANEL SWITCH ATTACHED TO ELECTRONIC APPARATUS

[75] Inventor: Koji Tanabe, Osaka, Japan

[73] Assignee: Matsushita Electric Industrial Co., Ltd., Osaka, Japan

[21] Appl. No.: 10,692

[22] Filed: Jan. 29, 1993

[30] Foreign Application Priority Data

Feb. 7, 1992 [JP] Japan .................................. 4-22300
Feb. 19, 1992 [JP] Japan .................................. 4-31673

[51] Int. Cl.$^5$ ................................................ B32B 31/00
[52] U.S. Cl. .................................. 156/73.1; 156/292;
156/277; 156/282; 156/291; 156/331.7;
156/332; 156/333; 156/334; 200/513; 29/882;
29/883; 29/885
[58] Field of Search .................. 156/292, 277, 73.1,
156/282, 291, 327, 331.7, 332, 333, 334;
200/512, 513; 29/622, 874, 882, 883, 885

[56] References Cited

U.S. PATENT DOCUMENTS

| | | | |
|---|---|---|---|
| Re. 22,301 | 4/1943 | Pitman | 156/272.2 |
| 3,022,814 | 2/1962 | Bodine, Jr. | 156/282 |
| 3,528,867 | 9/1970 | Leatherman | 156/272.2 |
| 3,886,012 | 5/1975 | Slater | 156/73.1 |
| 4,137,116 | 1/1979 | Miller | 156/292 |
| 4,315,793 | 2/1982 | Off et al. | 156/513 |
| 4,382,165 | 5/1983 | Balash et al. | 200/512 |
| 5,136,131 | 8/1992 | Komaki | 200/512 |

*Primary Examiner*—Chester T. Barry
*Attorney, Agent, or Firm*—Lowe, Price, LeBlanc & Becker

[57] ABSTRACT

A method for manufacturing a panel switch comprises of the steps of respectively mixing first and second adhesives which have no adhesive quality at a room temperature and have adhesive quality at a moderate temperature, printing an upper contacting point on one side of an upper sheet, printing the first adhesive on one side of the upper sheet to surround he upper contacting point, transforming the upper contacting point in a hemisphere form swelling toward the upper sheet;, printing a lower contacting point on one side of a lower sheet, printing the second adhesive on another side of the lower sheet, assembling a reinforcing plate, the lower sheet and the upper sheet in that order for the upper contacting point to face the lower contacting point, and simultaneously heating both the first adhesive layer and the second adhesive layer. In this case, the upper sheet is adhered to the lower sheet through the first adhesive, and the lower sheet is adhered to the reinforcing plate through the second adhesive.

10 Claims, 5 Drawing Sheets

METHOD FOR MANUFACTURING A PANEL SWITCH ATTACHED TO ELECTRONIC APPARATUS

BACKGROUND OF THE INVENTION

1. Field of the Invention:

The present invention relates generally to a method for manufacturing a panel switch utilized to operate electronic apparatus in an input processing, and, more particularly to a method for manufacturing a thin and lightweight type of panel switch.

2. Description of the Related Art:

Electronic apparatus such as an audio visual apparatus and an office automation apparatus have been recently miniaturized. Also, the electronic apparatus has been recently become light in weight so that the electronic apparatus can be carried. In contrast, a large number of electronic parts nave been put in the electronic apparatus at tight packing to fulfill a variety of operational functions. Also, a panel switch is necessarily required to operate the electronic: apparatus in an input processing.

Accordingly, a method for cheaply manufacturing a ;bin and lightweight type of panel switch utilized to operate a handy type of electronic apparatus has been required.

A conventional method for manufacturing a panel switch is described with reference to FIGS. 1, 2.

FIG. 1 is a sectional view showing a conventional method for manufacturing a conventional panel switch of which parts do not stick together. FIG. 2 is a sectional view of the conventional panel switch manufactured by the method shown in FIG. 1, the parts of the conventional panel switch sticking together.

As shown in FIG. 1, a plurality of conductive upper contacting points 11 are adhered under a flexible upper sheet 12. Each of the upper contacting points 11 is electrically connected with a patterned upper electrical circuit (not shown). Also, a plurality of conductive lower contacting points 13 are adhered on a lower sheet 14. Each of the lower contacting points 13 is electrically connected with a patterned lower electrical circuit (not shown). In this case, when the upper sheet 12 is arranged over the lower sheet 14, each of the upper contacting points 11 is positioned just above one of the lower contacting points 13. Thereafter, an insulating spacer 15 of which both sides are coated with adhesive is prepared. In this case, because the sides of the insulating spacer 15 are covered with sealing papers 16a, 16b, the sealing papers 16a, 16b are taken off from the insulating spacer 15. Also, the insulating spacer 15 has a plurality of openings. Therefore, when the insulating spacer 15 is arranged between the upper sheet 12 and the lower sheet 14, each of the openings in the insulating spacer 15 is positioned between the upper contacting point 11 and the lower contacting point 13.

Thereafter, as shown in FIG. 2, the upper sheet 12 is put on tile lower sheet 14 through the insulating spacer 15. In this case, because both sides of the insulating spacer 15 are coated with adhesive, both tile upper sheet 12 and the lower sheet 14 are adhered together through the insulating spacer 15. Thereafter, a reinforcing plate 17 is adhered under the lower sheet 14 through an adhesive sheet 18 of which both sides are coated with adhesive. In this case, because the sides of tile reinforcing plate 17 are covered with sealing papers 16c, 16d, the sealing papers 16c, 16d are taken off from the reinforcing plate 17 in advance. Thereafter, a plurality of hemispheric metal diaphragms 19 are arranged on the upper sheet 12. In this case, each of the diaphragms 19 is positioned just over one of the upper contacting points 11 through the upper sheet 12. Thereafter, the diaphragms 19 are Fixed on the upper sheet 12 by holding the diaphragms 19 down with an adhesive sheet 20 of which one side is coated with adhesive. That is, the diaphragms 19 are covered by the adhesive sheet 20 adhered on the upper sheet 12. In this case, because the side of the adhesive sheet 20 is covered with a sealing paper 16e, the sealing paper 16e is taken off from the adhesive sheet 20 in advance. As a result, a conventional panel switch 21 is manufactured.

In the above configuration of the conventional panel switch 21 manufactured according to a conventional method, when an operator pushes one of tile diaphragms 19, the diaphragm 19 pushed by the operator is transformed toward the upper sheet 12. Therefore, the upper contacting point which is adhered to the upper sheet 12 and is positioned just under the diaphragm 19 is pressed down to electrically contact with the lower contacting point 13. As a result, the upper electrical circuit connected with the upper contacting point 11 is electrically connected with the lower electrical circuit connected with the lower contacting point 13.

Accordingly, in cases where the conventional panel switch 21 is utilized in an input section of the electronic apparatus, pieces of information can be input to the electronic apparatus through the conventional panel switch 21.

Also, because an upward curve surface of the diaphragm 19 is inverted to a downward curve surface when the operator pushes the diaphragm 19, the operator can easily get the feel of the transformation of the diaphragm 19. This feel is called an inverted transformation feel in this specification. Therefore, tile operator can reliably become aware that the upper contacting point 11 come into contact with the lower contacting point 13.

However, because tile insulating spacer 15 and the adhesive sheets 18, 20 are covered with the sealing papers 16a to 16e, the sealing papers 16a to 16e must be taken off by hand from the spacer 15 and tile sheets 18, 20 when the spacer 15 and the sheets 18, 20 are adhered to the upper and lower sheets 12, 14. In addition, because a variety of panel switches in shape are utilized as required, the shapes of the spacer 15 and the sheets 18, 20 are diversified. Therefore, it is difficult to automatically take off the sealing papers 16a to 16e from the spacer 15 and the sheets 18, 20.

Accordingly, it is troublesome to take off the sealing papers 16a to 16e. Therefore, the conventional panel switch 21 can not be cheaply manufactured. Also, the conventional panel switch 21 can not be manufactured on a large scale.

SUMMARY OF THE INVENTION

An object of the present invention is to provide, with due consideration to the drawbacks of such a conventional method for manufacturing a panel switch, a method for cheaply manufacturing a panel switch on a large scale.

The object is achieved by the provision of a method for manufacturing a panel switch, comprising the steps of:

arranging an upper contacting point on one side of an upper sheet;

arranging a lower contacting point on one side of a lower sheet;

arranging an insulating layer on the one side of the lower sheet to surround the lower contacting point;

preparing a first adhesive which does not have an adhesive quality at a room temperature but has the adhesive quality at a moderate temperature higher than the room temperature, the moderate temperature being lower than melting points of the upper sheet and tile lower sheet;

preparing a second adhesive which does not have an adhesive quality at the room temperature but has the adhesive quality at the moderate temperature;

arranging a first adhesive layer formed of the first adhesive between the one side of the upper sheet and the insulating layer, the first contacting point being surrounded by the first adhesive layer and being not covered by the first adhesive layer;

arranging a second adhesive layer formed of the second adhesive between another side of the lower sheet and a reinforcing plate positioned under the another side of the lower sheet;

piling up the reinforcing plate, the lower sheet and the upper sheet in that order for the upper contacting point to face the lower contacting point, the upper and lower contacting points, the insulating layer, and the first adhesive layer being positioned between the upper and lower sheets, and the second adhesive layer being positioned between the lower sheet and the reinforcing plate;

pressing the reinforcing plate, the lower sheet and the upper sheet to one another; and simultaneously heating both the first adhesive layer and the second adhesive layer to the moderate temperature to stick the upper sheet to the lower sheet and to stick the lower sheet to the reinforcing plate, the panel switch in which the upper contacting point comes into contact with the lower contacting point when the upper contacting point is pushed toward the lower contacting point being manufactured.

In the above steps of the method according to the present invention, because the first adhesive layer is heated, the first adhesive layer become adhesive so that the upper sheet is, adhered to the lower sheet through the insulating layer. In this case, because the insulating layer is arranged between the upper and lower sheets, the upper contacting point is electrically insulated from the lower contacting point. When the upper sheet on the upper contacting point is pushed down, the upper contacting point is pressed toward the lower contacting point so that the upper contacting point comes into contact with the lower contacting point. Therefore, a panel switch in which a patterned electrical circuit electrically connected with the tipper contacting point carl be electrically connected with another patterned electrical circuit through the upper and lower contacting points is manufactured according to the method.

In addition, because the first and second adhesive layers have no adhesive quality at the room temperature, unskilled persons can easily handle the upper sheet arranged with the first adhesive layer and tile lower sheet arranged with the second adhesive layer. Also, because the first and second adhesive layers are changed to have the adhesive quality by applying the heat, the upper and lower sheets and the reinforcing plate can be adhered to each other at a time. Accordingly, the panel switch can be efficiently manufactured on a large scale.

Further, even though tile first and second adhesive layers are thinned, the upper and lower sheets and the reinforcing plate can be reliably adhered to each other. Also, even though the insulating layer is thinned, the upper contacting point is reliably insulated from the lower contacting point. Accordingly, a thin and lightweight type of panel switch can be easily manufactured.

Preferably, the method of the invention includes printing the upper contacting point on the upper sheet; and forming the contacting point into a hemisphere form having its convex surface facing the upper sheet.

In the above steps, tile upper contacting point takes tile form of, a hemisphere Therefore, when tile upper contacting point is pushed down toward the lower contacting point, a repulsion given from the upper contacting point is abruptly decreased just before the upper contacting point comes into contact with the lower contacting point. Accordingly, an operator can be easily and reliably aware of tile electric contact between the upper and lower contacting points.

Also, it is preferred that the step of simultaneously heating include:

providing ultrasonic wave to the upper and lower sheets and the reinforcing plate to vibrate them;

simultaneously heating the first and second adhesive layers by applying frictional heat generated by vibrations of the upper and lower sheets and the reinforcing plate; and changing the first and second adhesive layers having no adhesive quality to tile first and second adhesive layers having the adhesive quality.

In the above steps, the first and second adhesive layers are simultaneously changed to have the adhesive quality. Therefore, the upper and lower sheets and the reinforcing plate are simultaneously adhered to each other.

Also, it is preferred that the first and second adhesive layers, the upper and lower contacting points, and tile insulating plate be formed according to a screen processing print.

In the above steps, the first and second adhesive layers, the upper and lower contacting points, and the insulating plate are thinned and easily formed.

Also, it is preferred that melting points of the first and second adhesive layers differ from each other by temperatures from 5 to 90° C.

In the above steps, the heated temperatures of the first and second adhesive layers differ from each other because the lower sheet and the reinforcing plate prevent heat from transmitting. Therefore, the first and second adhesive layers have simultaneously the adhesive quality.

Also, it is preferred that the step of simultaneously heating both the first adhesive layer and the second adhesive layer include:

heating both the first adhesive layer and the second adhesive layer while forcibly cooling both the upper contacting point and the upper sheet positioned on the upper contacting point.

In the above steps, no heat deterioration is generated the upper contacting point and the upper sheet positioned on tile upper contacting point even though the first and second adhesive layers are heated.

Also, it is preferred that tile step of simultaneously heating both the first adhesive layer and the second adhesive layer include the step of attaching a hot plate on tile reinforcing plate to heat the first adhesive layer and the second adhesive layer.

In the above steps, heat applied by the hot plate to the reinforcing plate is initially transmitted to the second adhesive layer so that the second adhesive layer can get the adhesive quality. Thereafter, the heat is also transmitted to the first adhesive layer through the lower sheet so that the second adhesive layer can get the adhesive quality. As a result, the reinforcing plate, the lower sheet and the upper sheet are adhered to each other in that order.

Also, it is preferred that the first and second adhesive layers be made of thermoplastic resin selected from the group consisting of polyester resin, polyvinyl chloride resin, polyvinyl acetate resin, copolymer of ethylene-vinyl acetate, polyurethane resin, polystyrene resin, and phenoxy resin.

In the above steps, because the first and second adhesive layers is made of the thermoplastic resin, the first and second adhesive layers have no adhesive quality at the room temperature, and the first and second adhesive layers have the adhesive quality at the moderate temperature.

BRIEF DESCRIPTION OF THE DRAWINGS

The objects, features and advantages of the present invention will be apparent from the following description taken in conjunction with the accompanying drawings, in which.

DETAILED DESCRIPTION OF THE PREFERRED EMBODIMENTS

Preferred embodiments of a method for manufacturing a panel switch according to tile present invention are described with reference to drawings.

Figure 3:
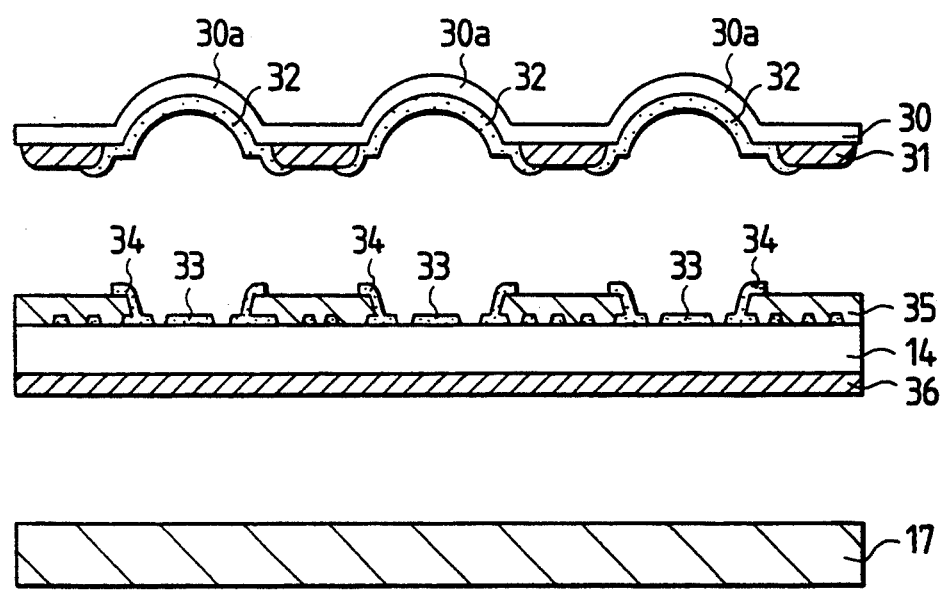
FIG. 3 is a sectional view showing a method for manufacturing a panel switch of which parts have not adhered together according to a first concept of the present invention.
Figure 4:
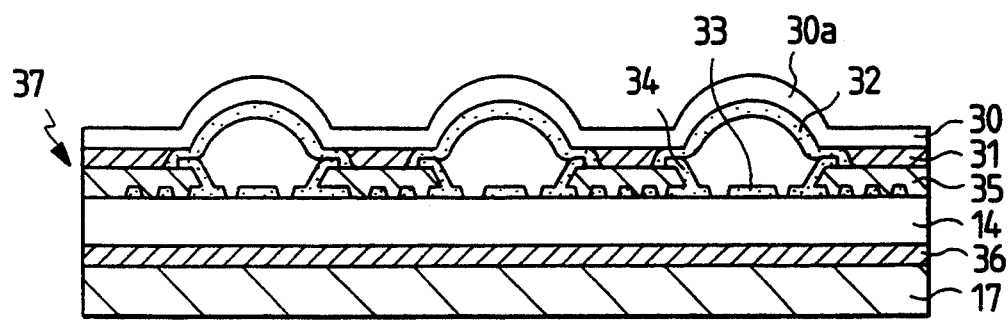
FIG. 4 is a sectional view of the panel switch manufactured by the method shown in FIG. 3, the parts of the conventional panel switch sticking together.

FIG. 3 is a sectional view showing a method for manufacturing a panel switch of which parts have not adhered together according to a first concept of the present invention. FIG. 4 is a sectional view of the panel switch manufactured by the method shown in FIG. 3, the parts of the conventional panel switch sticking together.

Figure 1:
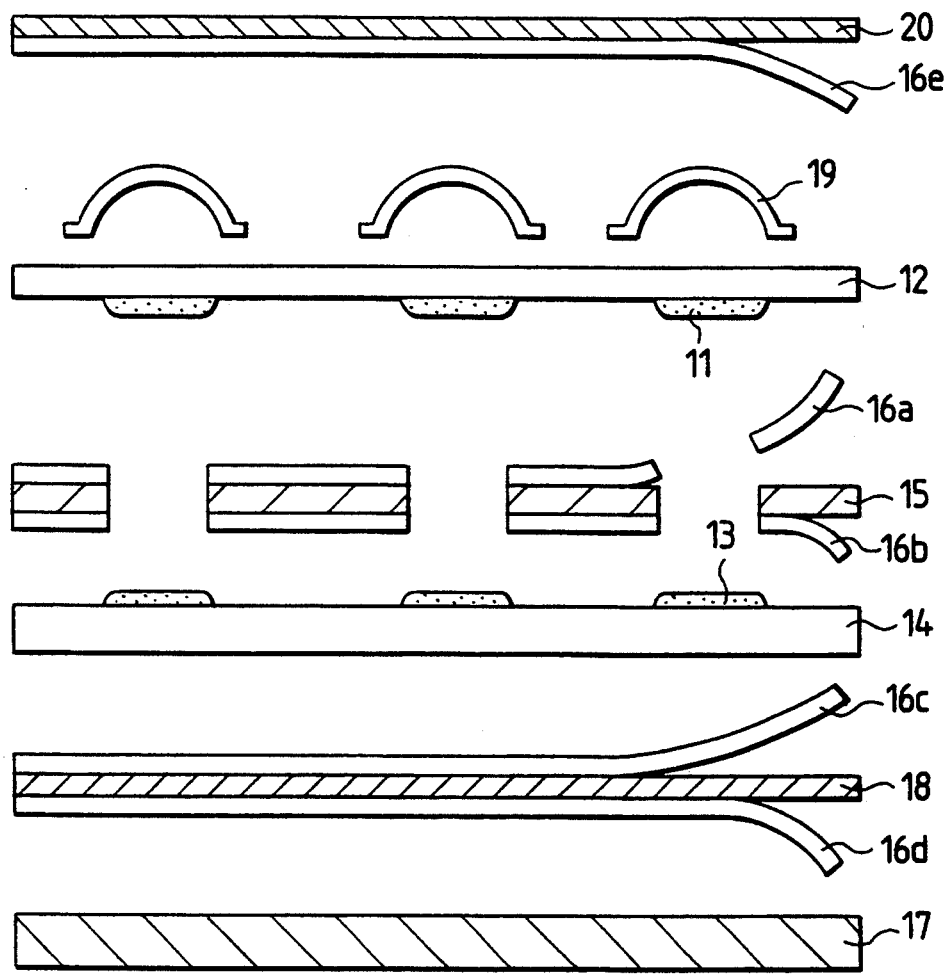
FIG. 1 is a sectional view showing a conventional method for manufacturing a conventional panel switch of which parts have not adhered together.
Figure 2:
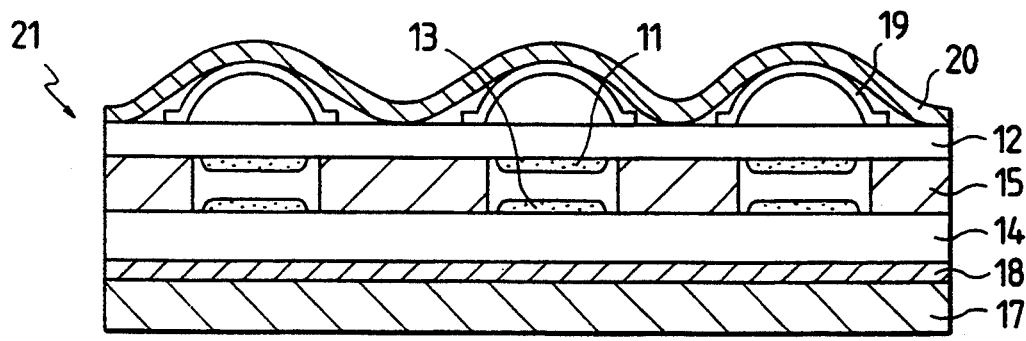
FIG. 2 is a sectional view of the conventional panel switch manufactured by the method shown in FIG. 1, the parts of the conventional panel switch sticking together.

Parts shown in FIGS. 3 & 4 which are substantially identical with the parts shown in FIGS. 1 & 2 are denoted by the same reference numerals as those shown in FIGS. 1 & 2.

As shown in FIG. 3, a first adhesive layer 31 is printed on an upper sheet 30 according to a screen processing print. In this case, circle portions positioned at regular intervals on the upper sheet 30 are not printed by the first adhesive layer 31. The first adhesive layer 31 has no adhesive quality when the temperature of the layer 31 is at a room temperature. Also, the first adhesive layer 31 has adhesive quality and thermal plasticity when the temperature of the layer 31 is at a moderate temperature higher than the room temperature. The moderate temperature is lower than melting points of the upper sheet 30 and the lower sheet 14. Thereafter, a plurality of conductive upper contacting points 32 are printed on the circle portions of the upper sheet 30 according to the screen processing printing. Each of the upper contacting points 32 is electrically connected with a patterned upper electrical circuit (not shown). Thereafter, a diaphragm (or hemisphere form) is embossed on the upper sheet 30 by die-stamping each of the conductive upper contacting points 32. Therefore, the diaphragm form of the contacting points has its convex surface facing the upper sheet 30. In this case, the circle portions of the upper sheet 30 are simultaneously pressed to form concavities 30a.

Thereafter, a plurality of conductive lower contacting points 33 are printed on one side of the lower sheet 14 according to the screen, process printing. Each of the lower contacting points 33 is electrically connected with a patterned lower electrical circuit (not shown). Also, a plurality of supports 34 are printed to surround the lower contacting points 33 in a one-to-one correspondence according to the screen process printing. Each of supports 34 is spaced From its corresponding lower contacting point 33. Therefore, when the upper sheet 30 is put on the lower sheet 14, the upper contacting points 32 are supported by the supports 34 in a one-to-one correspondence to prevent the upper contacting points 32 from making contact with the lower contacting points 33. Also, in this case, the upper contacting points 32 are positioned just above the lower contacting points 33 in a one-to-one correspondence. Thereafter, an insulating layer 35 is printed on the lower sheet 14 according to the screen processing print so as to surround the supports 34. The insulating layer 35 functions as a spacer so that each of the upper contacting points 32 is insulated from the other upper contacting points 32 and the lower contacting points 33 when tile upper sheet 30 is put on the lower sheet 14. Thereafter, a second adhesive layer 36 is printed on the other side of the lower sheet 14 to stick the lower sheet 14 to one side of the reinforcing plate 17. The second adhesive layer 36 has no adhesive quality when the temperature of the layer 36 is at the room temperature. Also, tile second adhesive layer 36 has adhesive quality and thermal plasticity when the temperature of the layer 36 is at the moderate temperature.

The first and second adhesive layers 31, 36 are formed of thermoplastic resin selected from tile group consisting of polyester resin, polyvinyl chloride resin, polyvinyl acetate resin, copolymer of ethylene-vinyl acetate, polyurethane resin, polystyrene resin, and phenoxy resin. In addition, it is preferred that one or more types of rubber selected from such as chloroprene rubber, acrylonitrile rubber, styrene butadiene rubber, natural rubber, and the like be mixed with the thermoplastic resin to form the first and second adhesive layers 31, 36. Also, it is preferred that the thermoplastic resin be denaturated to form the first and second adhesive layers 31, 36. Furthermore, the thermoplastic resin is dissolved into organic solvent such as isophorone, carbinol, cyelohexane, and the like. By dissolving the thermoplastic resin into the organic solvent, the first and second adhesive layers 31, 36 can be printed on the upper and lower sheets 30, 14 according to the screen process printing. If necessary, extender pigment such as titanium oxide, silica, talc, and the like is added to the thermo-plastic resin which is dissolved into the organic solvent.

Thereafter, as shown in FIG. 4, the reinforcing plate 17, the lower sheet 14 and the upper sheet 30 are piled up in that order. In this case, because the reinforcing plate 17, the lower sheet 14 and the upper sheet 30 are set at the room temperature, tile reinforcing plate 17, the lower sheet 14 and tile upper sheet 30 are not adhered to each other. Therefore, the first and second adhesive layers 31, 36 are indirectly heated by attaching a hot plate on the other side of tile reinforcing plate 17 to stick the reinforcing plate 17, the lower sheet 14 and the upper sheet 30 to each other. Conditions to heat the reinforcing plate 17 is determined by considering the melting points of the first and second adhesive layers 31, 36. In this concept of the present invention, it is proper to heat the reinforcing plate 17 between three seconds and three minutes, at pressures ranging from 0.5 to 60 kg/cm$^2$, and at temperatures ranging from 70 to 180° C.

Thereafter, a panel switch 37 is manufactured after the hot plate is taken off from the reinforcing plate 17 to cool the first and second adhesive layers 31, 36.

In the configuration of the panel switch 37 shown in FIG. 4, when an operator pushes the upper sheet 30 on an upper contacting point 32, the upper contacting point 32 is moved downward. Therefore, the upper contacting point 32 comes into contact with the lower contacting point 33 just under the upper contacting point 32. As a result, the patterned upper electrical circuit is electrically connected with the patterned lower electrical circuit through the upper and lower contacting points 32, 33.

Accordingly, because the first and second adhesive layers 31, 36 have no adhesive quality at tile room temperature, the upper and lower sheets 30, 14 and tile reinforcing plate 17 can be easily handled by an unskilled person. Also, because the first and second adhesive layers 31, 36 and the insulating layer 35 are printed according to the screen process printing, it is not required to take off tile sealing papers 16a to 16e. Therefore, the panel switch 37 according to the first concept can be cheaply manufactured on a large scale.

Also, because tile first and second adhesive layers 31, 36 are simultaneously changed to have the adhesive quality after the hot plate is attached to the reinforcing plate 17, the panel switch 37 can be rapidly and reliably manufactured.

In addition, even though the insulating layer 35 is thin, the upper and lower contacting points 32, 33 are reliably insulated from other contacting points 32, 33 because tile insulating layer 35 are reliably printed on the lower sheet 14 according to the screen process printing. Therefore, a thin type of panel switch can be easily manufactured.

Further, because the diaphragm shape of upper contacting points 32 are printed on tile upper sheet 30 and because the metal diaphragms 19 are not required, a lightweight type of upper contacting points 32 can be easily manufactured.

To efficiently stick the reinforcing plate 17, the lower sheet 14 and the upper sheet 30 to each other at a short time, it is preferred that tile melting point of the first adhesive layer 31 be lower than that of tile second adhesive layer 36 by temperatures from 5 to 90° C. The reason is that the temperature of the first adhesive layer 31 heated by the hot plate is lower than that of the second adhesive layer 36 heated by the hot plate because the heat transmitted from tile hot plate is thermally insulated by tile reinforcing plate 17 and the lower sheet 14.

In addition, to stick the reinforcing plate 17, the lower sheet 14 and the upper sheet 30 to each other in a shorter time, an ultrasonic heater is useful. In this case, the reinforcing plate 17, the lower sheet 14 and the upper sheet 30 are adhered to each other in one or two seconds.

Next, a first embodiment according to the first concept is described.

A biaxial oriented polyethylene terephthalate film of which the thickness is 120 μm is utilized as the upper sheet 30. The first adhesive layer 31 is formed of materials shown in Table 1. The materials are fully mixed with three rolls arranged in series.

TABLE 1

|  | products name | mixing ratio |
| --- | --- | --- |
| (manufacturer) TOUYOUBOU Inc. in Japan | VYLON ® 300 | 30% by weight |
| (manufacturer) TOUYOUBOU Inc. in Japan | VYLON ® 200 | 10% by weight |
| (manufacturer) NIPPON HARKYURESU Inc. in Japan | PICCOLASTIC ® A-7 | 10% by weight |
| extender pigment | powdered titanium oxide | 5% by weight |
| organic solvent | isophorone | 45% by weight |

In this case, as is well known, the products VYRON 300 and VYRON 200 are made of the thermo-plastic resin mentioned above. The melting point of the first adhesive layer 31 is at a temperature of 110° C. Therefore, the first adhesive layer 31 is heated over the temperature of 110° C. when the first adhesive layer 31 is printed on the upper sheet 30. After the first adhesive layer 31 is printed, the first adhesive layer 31 is dried for 30 minutes and at a temperature of 150° C. As a result, when the first adhesive layer 31 is cooled at the room temperature, the first adhesive layer 31 has no adhesive quality.

Figure 5:
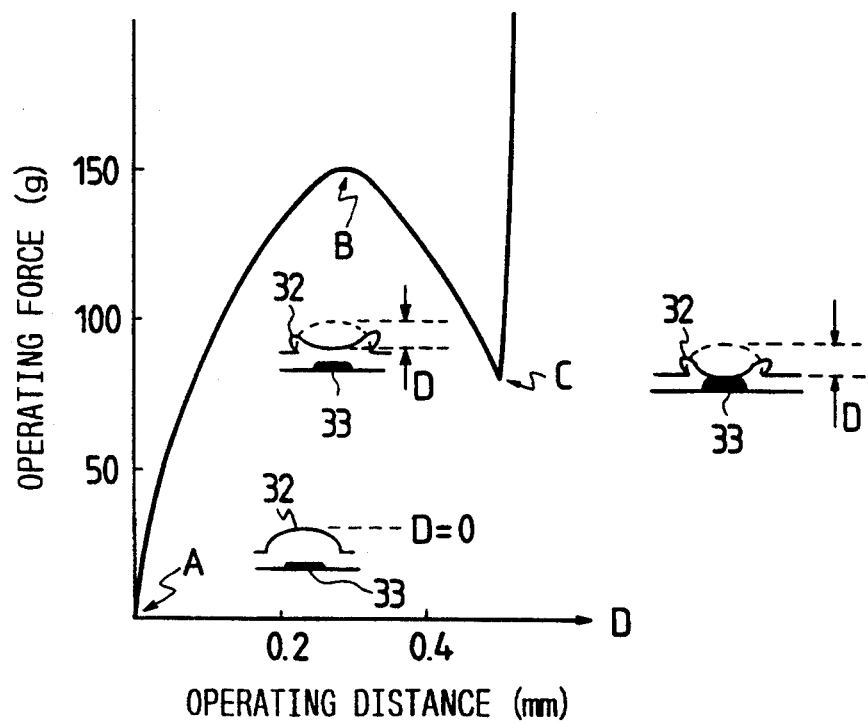
FIG. 5 is a graphic view showing the relation between an operating force and an operating distance in a panel switch manufactured according to the first concept.

The upper and lower contacting points 32, 33 are respectively formed of conductive ink manufactured by FUJIKURA KASEI Inc. in Japan, product No. XA-256. In this case, the upper contacting points 32 are transformed in a hemisphere form swelling upward. That is, as shown in FIG. 5, as an operator strongly pushes down the upper contacting point 32 at an operating force, the center of the upper contacting point 32 is pressed down by an operating distance while the operator feels a strong repulsion from the point 32 (from A to B in FIG. 5). However, the operator can feel an abrupt decrease of the repulsion just before tile upper contacting point 32 comes into contact with the lower contacting point 33 (from B to C in FIG. 5). Therefore, the operator can reliably feel the electrical contact between the upper and lower contacting points 32, 33.

Another biaxial oriented polyethylene terephthalate film of which the thickness is 75 μm is utilized as the lower sheet 14. The insulating layer 35 is formed of resist ink manufactured by FUJIKURA KASEI Inc. in Japan, product No. XB-803A. The resist ink is made of vinyl acetate=vinyl chloride type of resist. The second adhesive layer 36 is formed of materials shown in Table 2. The materials are fully mixed with three rolls arranged in series.

TABLE 2

|  | products name | mixing ratio |
| --- | --- | --- |
| (manufacturer) TOUYOUBOU Inc. in Japan | VYLON ® 300 | 30% by weight |
| (manufacturer) TOUYOUBOU Inc. in Japan | VYLON ® 200 | 20% by weight |
| extender pigment | powdered titanium oxide | 5% by weight |
| organic solvent | isophorone | 45% by weight |

In this case, the melting point of the second adhesive layer 36 is at a temperature of 135° C. Therefore, the second adhesive layer 36 is heated over the temperature of 135° C. when the second adhesive layer 36 is printed on the lower sheet 14. After the second adhesive layer 36 is printed, the second adhesive layer 36 is dried for 30 minutes and at a temperature of 150° C. As a result, when the second adhesive layer 36 is cooled at the room temperature, the second adhesive layer 36 has no adhesive quality.

The reinforcing plate 17 is formed of an aluminium plate of which the thickness is 0.5 mm. The upper and lower sheets 30, 14 and the aluminium plate 17 piled up are pressed at a pressure of 10 kg/cm², and the aluminium plate 17 are heated for five seconds and at a temperature of 150° C. to manufacture the panel switch 37 according to the first embodiment.

In this case, even though each of the upper contacting points 32 in the panel switch 37 is pushed two hundred thousand times so as to give tile inverted transformation feel to the operator, the panel switch 37 is not mechanically or electrically damaged. That is, the outside appearance of the panel switch 37 is not changed. Also, the upper and lower sheets 30, 14 and the aluminium plate 17 have been still adhered strongly to each other, and any electrical short does not occur. Also, electric conductivity is not broken down.

Next, a second embodiment according to the first concept is described with reference to FIG. 6.

The first and second adhesive layers 31, 36 are made in the same manner as in the first embodiment. Also, the upper and lower sheets 30, 14 and the reinforcing plate 17 are piled up in the same manner as in the first embodiment.

Figure 6:
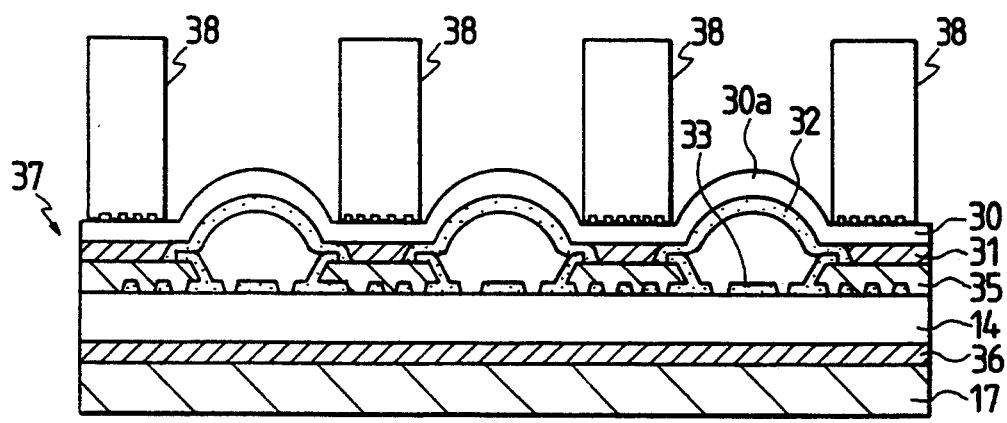
FIG. 6 is a sectional view of the panel switch manufactured by applying an ultrasonic horn to heat first and second adhesive layers according to a second embodiment of the first concept.

FIG. 6 is a sectional view of the panel switch 37 manufactured by applying an ultrasonic horn to heat the first and second adhesive layers 31, 36.

Thereafter, as shown in FIG. 6, an ultrasonic horn 38 is applied on a flat surface of the upper sheet 30 so that ultrasonic wave is provided to the upper and lower sheets 30, 14 and the reinforcing plate 17 to melt the first and second adhesive layers 31, 36. That is, because the upper and lower sheets 30, 14 and the reinforcing plate 17 are vibrated by the ultrasonic wave, the first and second adhesive layers 31, 36 are heated by frictional heat. The surface of the ultrasonic horn 38 applied on the upper sheet 30 has a large number of concavities regularly arranged at a pitch of 0.5 mm and at a depth of 0.3 mm to efficiently give the ultrasonic wave to the upper and lower sheets 30, 14 and the reinforcing plate 17.

In this case, even though each of the upper contacting points 32 in the panel switch 37 is pushed two hundred thousand times in the same manner as in the first embodiment, the panel switch 37 is not mechanically or electrically damaged in the same manner as in the first embodiment.

In the first and second embodiments, the first adhesive layer 31 is printed on the lower side of the upper sheet 30, and the second adhesive layer 36 is printed on the upper side of the lower sheet 14. However, it is preferred that the first adhesive layer 31 be printed on the upper side of the lower sheet 36 and the second adhesive layer 36 be printed on the upper side of the reinforcing plate 17.

Next, a second concept according to the present invention is described with reference to FIGS. 7, to 9.

The upper sheet 30 attached the diaphragm type of upper contacting points 32 and the first adhesive layer 31 is made in the same manner as in the first concept. Also, the lower sheet 14 attached the lower contacting points 33, the insulating layer 35, and the second adhesive layer 36 is made in the same manner as in the first concept. Thereafter, the reinforcing plate 17, the lower sheet 14, and the upper sheet 30 are piled up in that order.

Figure 7:
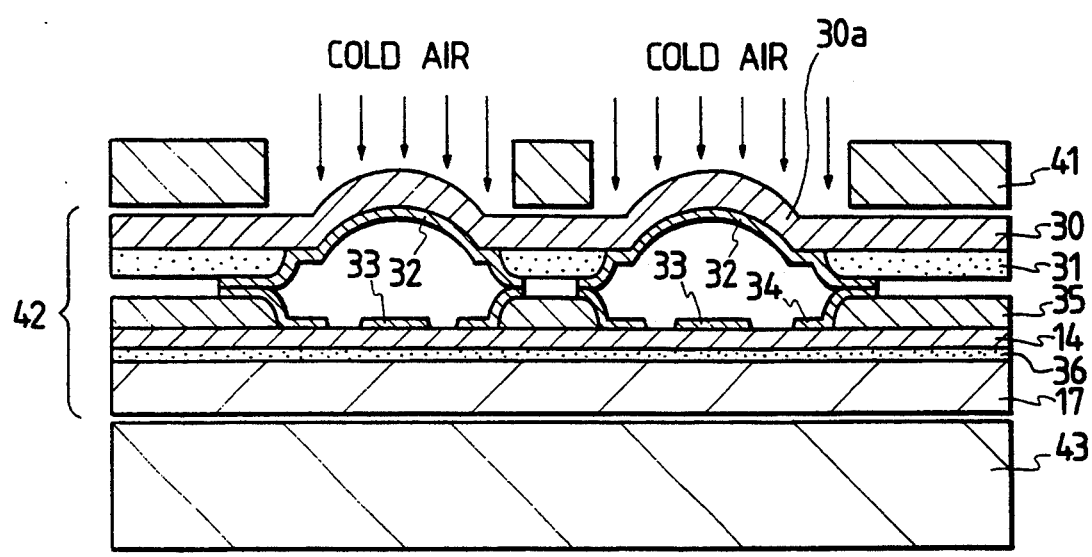
FIG. 7 is a sectional view showing a step of heating and pressing an assembly consisting of a reinforcing plate, a lower sheet, and an upper sheet piled up while concavities of the upper sheet are cooled by cold air according to a second concept.

FIG. 7 is a sectional view showing a step of heating and pressing an assembly consisting of the reinforcing plate 17, the lower sheet 14, and the upper sheet 30 piled up while concavities 30a of the upper sheet 30 are cooled by cold air.

Thereafter, as shown in FIG. 7, holding plates 41 are mounted on a flat surface of the upper sheet 30 to hold an assembly 42 consisting of the reinforcing plate 17, the lower sheet 14, and the upper sheet 30 piled up, and the concavities 30a of the upper sheet 80 are blown by cold air to forcibly cool both the concavities 30a and the upper contacting points 32. Thereafter, a hot plate 43 is applied on another side of the reinforcing plate 17 to heat and press the assembly 42 while forcibly cooling both the concavities 30a and the upper contacting points 32 with the cold air. In this case, even though the first and second adhesive layer 31, 36 are heated at the moderate temperature, the concavities 30a and the upper contacting points 32 remain cooled at the room temperature because the concavities 30a are blown by the cold air.

Figure 8:
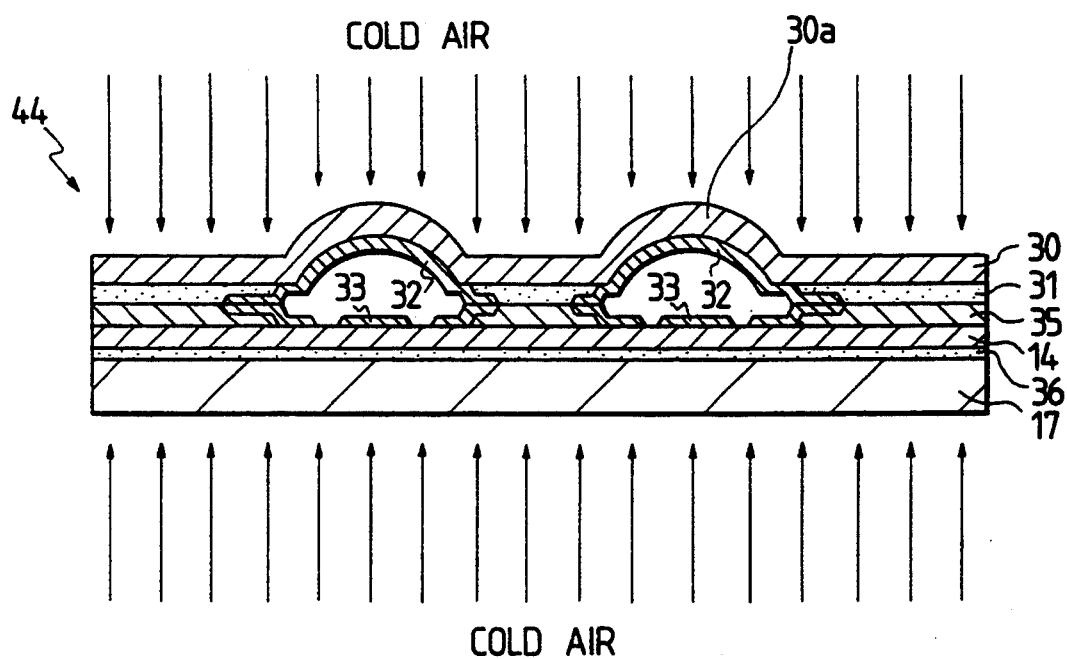
FIG. 8 is a sectional view showing a step of cooling the assembly shown in FIG. 7 according to the second concept.

FIG. 8 is a sectional view showing a step of cooling the assembly 42 shown in FIG. 7.

After the reinforcing plate 17, the lower sheet 14, and the upper sheet 30 piled up are adhered to each other by the first and second adhesive layer 31, 36 which are changed to have the adhesive quality, the hot plate 43 and holding plates 41 are taken off from the assembly 42. Thereafter, as shown in FIG. 8, the entire surfaces of both the reinforcing plate 17 and the upper plate 30 are immediately blown by the cold air to cool the assembly 42. As a result, a panel switch 44 according to the second concept is manufactured.

Accordingly, because the concavities 30a of the upper sheet and the upper contacting points 32 remain cooled while the first and second adhesive layer 31, 36 are heated by the hot plate 43, no heat deterioration is generated in the concavities 30a and the upper contacting points 32. Therefore, even though the concavities 30a and the upper contacting points 32 are pushed down many times, the concavities 30a are not mechanically damaged, and the upper contacting points 32 are not mechanically and electrically damaged. That is, the panel switch 44 can be utilized for a long time.

Also, a thin and lightweight type of panel switch 44 can be cheaply manufactured on a large scale in the same manner as in the first concept.

Next, a first embodiment according to the second concept is described.

The upper sheet 30 attached the diaphragm type of upper contacting points 32 and the first adhesive layer 31 is made of the same materials as in the first embodiment of the first concept. Also, the lower sheet 14 attached the lower contacting points 33, the insulating layer 35, and the second adhesive layer 36 is made of the same materials as in the first embodiment of the first concept.

The assembly 42 is pressed by the hot plate 43 at a pressure of 10 kg/cm$^2$ and the concavities 30a of the upper sheet and the upper contacting points 32 are blown by cold air which is cooled at temperatures from 0 to 5° C. The aluminium plate 17 are heated for five seconds and at a temperature of 150° C.

In this case, even though each of the upper contacting points 32 in the panel switch 37 is pushed two hundred thousand times so as to give the inverted transformation feel to the operator, the panel switch 44 is not mechanically or electrically damaged.

Figure 9:
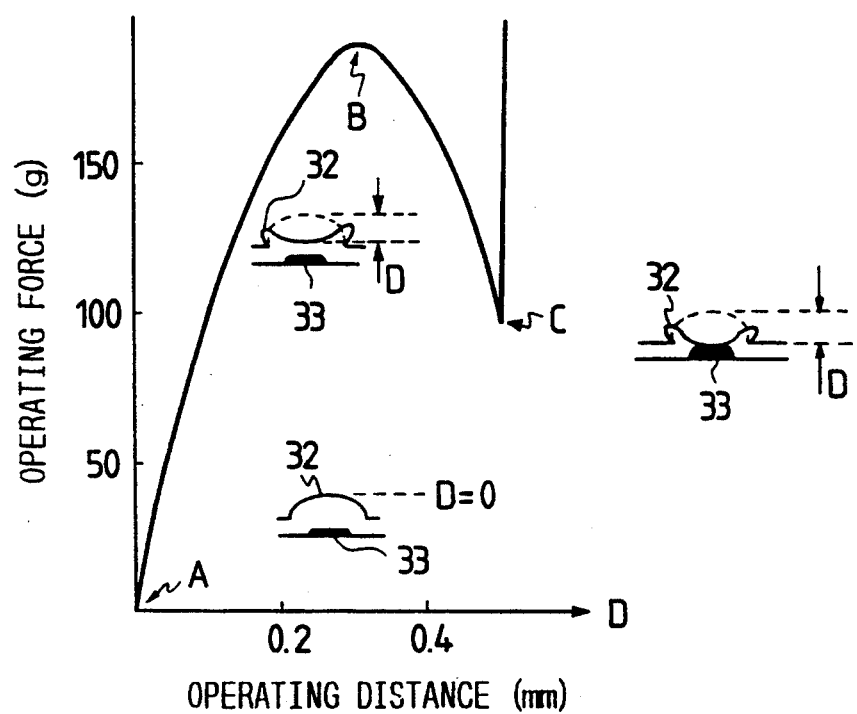
FIG. 9 is a graphic view showing the relation between an operating force and an operating distance in a panel switch manufactured according to the second concept.

FIG. 9 is a graphic view showing the relation between an operating force and an operating distance in the panel switch 44 manufactured according to the second concept.

As shown in FIG. 9, the repulsion given from the upper contacting point 32 when an operator pushes down at an operating force (from A to B in FIG. 9) is larger than that shown in FIG. 5. Also, the abrupt decrease of the repulsion (from B to C in FIG. 9) is larger than that shown in FIG. 5. The reason that the repulsion and the abrupt decrease of the repulsion are large in the panel switch 44 is because no heat deterioration is generated in the concavities 30a and the upper contacting points 32. Therefore, the operator can be more reliably aware that the upper contacting point 32 comes into contact with the lower contacting point 33.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A method for manufacturing a panel switch, comprising the steps of:
   providing an upper sheet and printing an upper contacting point on one side of the upper sheet;
   forming the upper contacting point into a hemisphere form having its convex surface facing the upper sheet;
   arranging a lower contacting point on one side of a lower sheet;
   arranging an insulating layer on the one side of the lower sheet to surround the lower contacting point;
   preparing a first adhesive which does not have an adhesive quality at a room temperature but has the adhesive quality at a moderate temperature higher than the room temperature, the moderate temperature being lower than melting points of the upper sheet and the lower sheet;
   preparing a second adhesive which does not have an adhesive quality at the room temperature but has the adhesive quality at the moderate temperature;
   arranging a first adhesive layer formed of the first adhesive between the one side of the upper sheet and the insulating layer, the first contacting point being surrounded by the first adhesive layer and not covered by the first adhesive layer;
   arranging a second adhesive layer formed of the second adhesive between another side of the lower sheet and a reinforcing plate positioned under the another side of the lower sheet;
   assembling the reinforcing plate, the lower sheet and the upper sheet in that order for the upper contacting point to face the lower contacting point, the upper and lower contacting points, the insulating layer, and the first adhesive layer being positioned between the upper and lower sheets, and the second adhesive layer being positioned between the lower sheet and the reinforcing plate;
   pressing the reinforcing plate, the lower sheet and the upper sheet to one another; and
   simultaneously heating both the first adhesive layer and the second adhesive layer to the moderate temperature to adhere the upper sheet to the lower sheet and to adhere the lower sheet to the reinforcing plate, a panel switch in which the upper contacting point comes into contact with the lower contacting point when the upper contacting point is pushed toward the lower contacting point being manufactured.

2. A method according to claim 1 in which the step of forming the upper contacting point into a hemisphere form includes embossing the hemisphere form on the upper sheet by die-stamping the upper contacting point.

3. A method according to claim 1 in which the step of simultaneously heating both the first adhesive layer and the second adhesive layer includes:
   providing ultrasonic waves to the upper and lower sheets and the reinforcing plate to vibrate them;
   simultaneously heating the first and second adhesive layers by applying frictional heat generated by vibrations of the upper and lower sheets and the reinforcing plate; and
   changing the first and second adhesive layers having no adhesive quality to the first and second adhesive layers having the adhesive quality.

4. A method according to claim 1 in which the first and second adhesive layers, the upper and lower contacting points, and the insulating plate are formed according to a screen processing print.

5. A method according to claim 1 in which melting points of the first and second adhesive layers differ from each other by temperatures from 5 to 90° C.

6. A method according to claim 1 in which the step of simultaneously heating both the first adhesive layer and the second adhesive layer includes:
heating both the first adhesive layer and the second adhesive layer while forcibly cooling both the upper contacting point and the upper sheet positioned on the upper contacting point.

7. A method according to claim 1, further including the step of forcibly cooling the upper sheet and the reinforcing plate after the upper sheet and the lower sheet are adhered to each other in the step of simultaneously heating both the first adhesive layer and the second adhesive layer.

8. A method according to claim 1 in which the step of simultaneously heating both the first adhesive layer and the second adhesive layer includes:
attaching a hot plate on the reinforcing plate to heat the first adhesive layer and the second adhesive layer;
forcibly cooling both the upper contacting point and the upper sheet on which the upper contacting point is arranged; and
changing the first and second adhesive layers having no adhesive quality to first and second adhesive layers having the adhesive quality.

9. A method according to claim 1 in which the first and second adhesive layers are made of thermoplastic resin selected from the group consisting of polyester resin, polyvinyl chloride resin, polyvinyl acetate resin, copolymer of ethylene-vinyl acetate, polyurethane resin, polystyrene resin, and phenoxy resin.

10. A method according to claim 1 in which the step of simultaneously heating both the first adhesive layer and the second adhesive layer includes:
providing ultrasonic wave to the upper and lower sheets and the reinforcing plate to vibrate them;
simultaneously heating the first and second adhesive layers by applying frictional heat generated by vibrations of the upper and lower sheets and the reinforcing plate;
forcibly cooling both the upper contacting point and the upper sheet on which the upper contacting point is arranged; and
changing the first and second adhesive layers having no adhesive quality to first and second adhesive layers having the adhesive quality.

* * * * *